US012218739B2

(12) United States Patent
Nast et al.

(10) Patent No.: US 12,218,739 B2
(45) Date of Patent: Feb. 4, 2025

(54) CIRCUIT ARRANGEMENT AND METHOD FOR IDENTIFYING A FREQUENCY BAND OR CHANNEL

(71) Applicant: Molex Technologies GmbH, Schönefeld (DE)

(72) Inventors: Helmut Nast, Berlin (DE); Ahmed Sayed, Berlin (DE)

(73) Assignee: MOLEX TECHNOLOGIES GMBH, Schönefeld (DE)

( * ) Notice: Subject to any disclaimer, the term of this patent is extended or adjusted under 35 U.S.C. 154(b) by 196 days.

(21) Appl. No.: 17/782,664

(22) PCT Filed: Dec. 18, 2020

(86) PCT No.: PCT/EP2020/087059
§ 371 (c)(1),
(2) Date: Jun. 6, 2022

(87) PCT Pub. No.: WO2021/123193
PCT Pub. Date: Jun. 24, 2021

(65) Prior Publication Data
US 2023/0013248 A1 Jan. 19, 2023

(30) Foreign Application Priority Data

Dec. 19, 2019 (DE) ..................... 10 2019 220 166.0

(51) Int. Cl.
*H04B 7/15* (2006.01)
*H04B 7/155* (2006.01)

(52) U.S. Cl.
CPC ................................ *H04B 7/15528* (2013.01)

(58) Field of Classification Search
CPC ........................... H04B 7/15528; H04B 1/3822
See application file for complete search history.

(56) References Cited

U.S. PATENT DOCUMENTS

2002/0080891 A1  6/2002  Ahn et al.
2017/0257833 A1  9/2017  Hannan
(Continued)

FOREIGN PATENT DOCUMENTS

CN       1801632 A      7/2006
DE  102017209209 A1    12/2018
(Continued)

OTHER PUBLICATIONS

International Preliminary Report on Patentability received for PCT application No. PCT/EP2020/087059, mailed on Jun. 30, 2022, 17 pages (10 pages of English copy and 7 pages of official copy).
(Continued)

*Primary Examiner* — Hashim S Bhatti

(57) ABSTRACT

The disclosure relates to a circuit arrangement for transmitting uplink and downlink signals between at least one terminal device and at least one antenna, wherein the circuit arrangement comprises a signal coupler for providing a decoupled uplink or downlink signal, a device for providing a reference signal of adjustable frequency, a mixer for mixing the decoupled signal and the reference signal and a filter device for low-pass or bandpass filtering of the mixed signal, wherein the circuit arrangement comprises an evaluation device for evaluating the filtered signal, wherein, depending on the adjusted frequency of the reference signal and on at least one signal property of the filtered signal, a frequency band or channel in which the transmitted signal is being transmitted can be identified, and also to a method for identifying a frequency band or channel.

16 Claims, 9 Drawing Sheets

(56) References Cited

U.S. PATENT DOCUMENTS

| | | | |
|---|---|---|---|
| 2017/0288766 A1 | 10/2017 | Cook et al. | |
| 2019/0028135 A1 | 1/2019 | Nast et al. | |
| 2019/0335401 A1 | 10/2019 | Lindenmeier et al. | |
| 2020/0204249 A1* | 6/2020 | Pyun | H04J 14/0256 |
| 2022/0166492 A1* | 5/2022 | Anderson | H04B 1/0064 |
| 2022/0399935 A1* | 12/2022 | Cho | H04B 7/15528 |

FOREIGN PATENT DOCUMENTS

| | | |
|---|---|---|
| JP | 2013187671 A | 9/2013 |
| KR | 20150078588 A | 7/2015 |

OTHER PUBLICATIONS

International search report and written opinion received for PCT application No. PCT/EP2020//087059, mailed on Apr. 1, 2021, 19 pages (9 pages of english translation and 10 pages of official copy).

\* cited by examiner

CIRCUIT ARRANGEMENT AND METHOD FOR IDENTIFYING A FREQUENCY BAND OR CHANNEL

CROSS-REFERENCE TO RELATED APPLICATIONS

This application is a national phase of PCT/EP2020/087059, filed on Dec. 18, 2020, which claims the benefit of priority to German Patent Application No. 10 2019 220 166.0, filed on Dec. 19, 2019, both of which are incorporated herein by reference in their entireties.

TECHNICAL FIELD

The invention relates to a circuit arrangement for transmitting uplink and downlink signals between at least one terminal device and at least one antenna and also to a method for identifying a frequency band or channel.

BACKGROUND ART

DE 10 2017 209 209 A1 discloses a signal coupling device and a method for operating a signal coupling device. This signal coupling device comprises a transmission activity detection device. By means of this device, transmission activity can be detected transmission-band-specifically. In other words, an active transmission band can be identified, wherein a transmission signal is being transmitted in this active transmission band.

SUMMARY

It is desirable to identify frequency bands or channels in which an uplink or a downlink signal is being transmitted. This identification can be used to carry out a desired signal processing, in particular a desired signal amplification, by means of a circuit arrangement for signal transmission and/or the creation of desired signal paths of the circuit arrangement. For example, it may be desirable to activate only those amplifier devices of the circuit arrangement that serve to amplify the signals being transmitted in the corresponding frequency band or in the corresponding channel. Other amplifier devices can be deactivated here, thereby reducing an energy consumption of the circuit arrangement.

Known transmission activity detection devices generally comprise a multitude of filter devices, for example bandpass filters, which serve for filtering frequency-band-specific signals. The use of the filter devices thus generates production costs and requires a large amount of installation space.

In addition, known devices comprise a multitude of amplifiers, switching elements as well as a broadband detector. This requires a complex structure of the circuit arrangement.

The technical problem is to provide a circuit arrangement for transmitting uplink and downlink signals between at least one terminal device and at least one antenna and a method for identifying a frequency band or channel, which enable precise, reliable and fast identification of the frequency band or the channel, wherein production costs and complexity of the circuit arrangement are reduced.

The technical problem is solved by the objects with the features of the independent claims. Further, advantageous embodiments of the invention emerge from the dependent claims.

A circuit arrangement for transmitting uplink and downlink signals between at least one terminal device and at least one antenna is proposed. By means of the circuit arrangement, it is possible to compensate for losses in the transmission of these uplink and downlink signals, for example losses in signal-conducting components.

A terminal device may be a portable terminal device, for example, a terminal device which can be carried by a user. Such a terminal device may, for example, be a mobile telephone or a tablet PC. In addition, a terminal device can also be a modem or a control device, in particular of a vehicle, for example, a telematics control unit. The terminal device can thus also be a permanently installed terminal device, for example, a terminal device permanently installed in the vehicle.

A plurality of uplink signals can be transmitted by the circuit arrangement. Preferably, uplink signals with frequencies from mutually different uplink frequency bands can be transmittable, wherein an uplink signal transmitted in an uplink frequency band has a frequency from this frequency band. This can also be referred to as an interband carrier aggregation. If a plurality of uplink signals are transmitted in different channels of a frequency band, this can be referred to as intraband carrier aggregation.

Mutually different uplink frequency bands can serve for transmitting uplink signals in accordance with one radio standard or different radio standards. Such standards may, for example, be a GSM standard, a UMTS standard, an LTE standard, a Wi-Fi, or 5G New Radio standard.

An uplink frequency band can be assigned to precisely one but also to a plurality of standards. It is thus possible for uplink signals to be transmitted in accordance with different standards in the same uplink frequency band. If a frequency of an uplink signal is recognized/detected, the standard can be determined in such a case only by means of an additional signal analysis.

For example, signals can be transmitted in an uplink frequency band in accordance with the GSM and/or LTE and/or UMTS and/or a further standard.

A plurality of downlink signals can also be transmitted by the circuit arrangement. An interband or intraband carrier aggregation is thus also possible in the transmission of downlink signals. Downlink signals with frequencies from mutually different downlink frequency bands can preferably be transmitted, wherein a downlink signal transmitted in a downlink frequency band has a frequency from this frequency band. Mutually different downlink frequency bands can be used in particular for transmitting downlink signals in accordance with the various standards mentioned.

Here, a downlink frequency band can be assigned to precisely one but also to a plurality of standards. It is thus possible for downlink signals to be transmitted in the same downlink frequency band in accordance with different standards. If a frequency of a downlink signal is recognized/detected, the standard can be determined in such a case only by means of an additional signal analysis.

In addition, uplink and downlink signals can be transmitted in a time duplex method, which can also be referred to as a TDD method (time-division duplex method), or in a frequency duplex method, which can also be referred to as FDD (frequency-division duplex) method. The invention is not limited to the aforementioned radio standards or duplex methods and thus relates to all radio standards and duplex methods already known to the person skilled in the art as well as to future radio standards and duplex methods.

The circuit arrangement can comprise a terminal-device-side interface. This can denote an interface via which a signal-related connection can be established between the circuit arrangement and the terminal device. In this case, the terminal-device-side interface can enable a bidirectional transmission of signals. For example, the terminal-device-side interface can comprise a so-called wireless coupler.

In addition, the circuit arrangement can comprise precisely one antenna-side interface or a plurality of antenna-side interfaces. This can denote an interface via which a signal-related connection can be established between the circuit arrangement and one or more antennas. The antenna may be an antenna external to the terminal device. However, it is also possible for the antenna(s) to be part of the circuit arrangement. The antenna can serve, in particular, for receiving signals transmitted by a base station. In addition, the antenna can serve for transmitting signals which are to be transmitted to the base station or to a further device. Here, the antenna-side interface can enable a bidirectional transmission of signals.

The circuit arrangement can here be arranged in a vehicle, in particular a motor vehicle. In this case, the antenna external to the terminal device can in particular be a vehicle antenna. The circuit arrangement can also in particular be part of a mobile radio amplification device or comprise or form a mobile radio amplification device.

For the purposes of this invention, a connection can denote a signal-related connection. This can in particular be a galvanic and/or inductive and/or capacitive connection. A connection is preferably a galvanic connection. Components of the circuit arrangement can preferably be connected by galvanic and inductive connections. However, the connection of the circuit arrangement to the terminal device can be an inductive connection or a capacitive connection.

An uplink path can here denote a signal path via which an uplink signal can be transmitted from the terminal-device-side interface to the antenna-side interface. The uplink signal can in particular denote a signal generated by the terminal device and transmitted to the terminal-device-side interface.

Here, a downlink path can denote a signal path via which a downlink signal can be transmitted from the antenna-side interface to the terminal-device-side interface. The downlink signal can in particular be a signal which was received by the antenna external to the terminal device and which was transmitted, for example, by the base station.

Signal processing means can be arranged in an uplink path and/or a downlink path. This can mean that the transmission of a signal via one of these signal paths can take place via active and/or passive signal processing means. For example, signal transmission can take place via at least one amplifier device and/or at least one attenuator device and/or at least one signal filter device and/or at least one signal switching device.

The circuit arrangement comprises at least one signal coupler for providing a decoupled uplink or downlink signal. The signal coupler may, for example, decouple an uplink signal transmitted via an uplink path from that uplink path. Accordingly, the signal coupler may also decouple a downlink signal transmitted via a downlink path from that downlink path.

In particular, the signal coupler can be arranged and/or designed in such a way that a signal present at the previously mentioned terminal-device-side interface is decoupled. The design of a suitable signal coupler is known to the person skilled in the art. In particular, the signal coupler may provide a decoupled signal with lower power than the transmitted uplink or downlink signal, but wherein the decoupled signal otherwise has the same signal properties as the transmitted uplink or downlink signal.

According to the invention, the circuit arrangement comprises at least one means for providing a reference signal of an adjustable frequency. A signal of a desired frequency can thus be provided by this means. In this case, the frequency can be adjusted, for example, by a control device of the circuit arrangement. Here, the control device can be formed by a control and evaluation device. In this case, the control device or the control and evaluation device can be designed as a microcontroller or as an integrated circuit or comprise one of these.

In addition, the circuit arrangement comprises at least one mixer for mixing the decoupled signal and the reference signal and at least one filter device for the low-pass or bandpass filtering of the mixed signal. By means of the mixer, an output signal can be generated which comprises a component of the frequency or frequencies of the reference signal, a component of the frequency or frequencies of the decoupled signal, a component of a frequency corresponding to the magnitude of the difference between the frequency or frequencies of the reference signal and the frequency or frequencies, in particular the carrier frequency, of the decoupled signal, a component of a frequency corresponding to the sum of the frequency or frequencies of the reference signal and the frequency or frequencies, in particular the carrier frequency, of the decoupled signal, as well as integral multiples of these components.

In particular, the output signal of the mixer thus comprises a difference component with a further frequency that is equal to the magnitude of the difference between the frequency of the reference signal and the carrier frequency of the decoupled signal. It is also possible for the output signal to comprise further signal components of further frequencies, in particular a so-called frequency mixture component.

The filter device can in particular be a low-pass filter or bandpass filter. As explained in more detail below, the cut-off frequency or frequencies of the low-pass filter or of the bandpass filter can be adjustable. For example, the cut-off frequency or the cut-off frequencies can be adjusted by the control device mentioned. By adjusting the cut-off frequency, it can be achieved in particular that the difference component mentioned is filtered out of the output signal of the mixer and is then used for the subsequent analysis.

The filter device can in particular be a programmable filter device. In particular, the filter device can also be a digital filter device, for example, a digital low-pass filter or a digital bandpass filter.

In addition, the circuit arrangement comprises at least one evaluation device for evaluating the filtered signal. The evaluation device can be formed by the control and evaluation device previously mentioned. According to the design of the control device, the evaluation device can also be designed as a microcontroller or as an integrated circuit or comprise one of these.

At least one signal property of the filtered signal can be evaluated by the evaluation device. It is possible here for this at least one signal property to be determined by the evaluation device. The at least one signal property can in particular be a signal power. A signal power can be represented in particular by a signal level. It is possible for the signal property to be determined for a prespecified time period, for example for 50 µs. The prespecified time period can in this case depend on the number of frequency bands to be investigated and the time period of a signal burst, during which the desired identification of the frequency band or of the channel can take place. The time period can be in a range of 10 µs to 100 µs, preferably in a range of 20 µs to 50 µs. Depending on the application, however, the time period can also be in the range of one to several ms, for example up to 10 ms.

For example, it is possible for the signal property to be compared with prespecified threshold values. Of course, other forms of evaluation are also conceivable.

In addition, in particular by means of the evaluation device, at least one frequency band or at least one channel in which the transmitted signal is being transmitted is identifiable as a function of the adjusted frequency of the reference signal and of the at least one signal property of the filtered signal. It is conceivable here that precisely one frequency band or precisely one channel is identified. However, it is also possible for a plurality of frequency bands or a plurality of channels to be identified in each of which a signal is being transmitted.

In this case, a frequency band can comprise a plurality of channels. A channel here denotes a sub-band of the frequency band, which sub-band comprises only a portion of the frequencies of the frequency band. It is possible for a plurality of signals to be transmitted simultaneously via different channels of a frequency band, which can also be referred to as intraband carrier aggregation.

Precisely one carrier frequency, for example a center frequency of the frequency band/channel, can in each case be assigned to a frequency band or a channel. A carrier frequency and a plurality of sub-carrier frequencies may also be assigned to a frequency band or a channel.

If, for example, the signal power of the filtered signal is greater than a prespecified threshold value, it can be identified that the signal is being transmitted in a frequency band or channel which includes the frequency of the reference signal or whose frequencies, in particular its carrier frequency, do not differ more than a prespecified amount from this frequency.

A cut-off frequency of the low-pass filter or cut-off frequencies of the bandpass filter, which determine the bandwidth of the bandpass filter, can be selected in particular in such a way that components of the mixed signal whose frequency is higher than a prespecified amount are reduced.

In particular, the cut-off frequency can be selected in such a way that the previously mentioned sum component is attenuated, in particular with a desired attenuation. In other words, the sum component of the mixed signal can thus be filtered out.

In addition, the cut-off frequency can be selected in such a way that signal components of the difference component of frequencies that are higher than the prespecified amount are attenuated, in particular with a desired attenuation.

This can result in the difference component being attenuated when a magnitude of the difference between the frequency of the reference signal and the (carrier) frequency of the decoupled signal is greater than a prespecified amount. The difference component is not attenuated or is attenuated by no more than a prespecified amount by the filter device if the magnitude of the difference between the frequency of the reference signal and the (carrier) frequency of the decoupled signal is less than a prespecified amount or is equal to the prespecified amount. This can lead in particular to a signal power of a difference component only being greater than a prespecified threshold value if the frequency of the reference signal corresponds to the frequency, in particular to the carrier frequency, of the transmitted signal or does not deviate by more than the prespecified amount from the frequency of the transmitted signal.

In other words, an output signal that is in this way unattenuated or little attenuated is provided by the filter device only if the deviation between the frequency of the reference signal and the (carrier) frequency of the decoupled signal is less than the prespecified amount.

It is possible, for example, for precisely one or for more adjustable frequencies of the reference signal to be assigned to different frequency bands or channels that are to be identified. If it is detected for this adjustable frequency or one of these adjustable frequencies that the signal property meets a specific criterion, for example a signal power greater than a prespecified threshold value, the frequency band assigned to this adjustable frequency can then be identified as the frequency band or the channel assigned to this adjustable frequency can then be identified as the channel by transmitting the transmitted signal.

It is of course conceivable that after the identification of a frequency band or channel in which a signal is being transmitted, a new identification of a further frequency band or further channel in which a further signal is being transmitted is started. In this way, different frequency bands which are used in an interband carrier aggregation can advantageously be identified.

The totality consisting of the device for providing a reference signal, the mixer, the filter device and the evaluation device can also be referred to as a universal detector. The latter preferably carries out a method according to the principle of the direct-conversion receiver. This method results in the reference signal and the decoupled signal being "mixed to zero," wherein the difference between the two signals is used as the mixed product. A signal mixed to zero is formed in particular when the reference signal and a carrier component (component of the carrier frequency) of the decoupled signal have the same frequency. In this case, the frequency mixture of VCO signal and carrier component results in an output signal of the frequency zero. Sidebands, in particular an upper sideband, of the decoupled signal are converted by the mixture into the baseband. The decoupled signal is here a modulated signal with a carrier component, a baseband and further sidebands of higher order.

The output signal of the mixer generally contains a multitude of mixed products, such as sum frequencies of the reference signal and of the decoupled signal, harmonics of both signals and difference and sum frequencies of higher order. The filter device can then easily separate frequencies of the baseband of the decoupled signal from the further components of the output signal. For this purpose, the first-order difference frequency or the highest frequency of the baseband of the decoupled signal is preferably used as the cut-off frequency of the filter device, whereby the further components mentioned of the output signal of the mixer, which all have higher frequency components, can be filtered out of the output signal.

If, as explained in more detail below, the cut-off frequency is programmable, the latter can be selected in the application such that the channel bandwidth of the transmitted signal can be determined within a mobile radio frequency band. It is also possible to determine a plurality of transmitted signals and their channel bandwidth within a frequency band (intraband). Such a detection of a plurality of signals is desirable in particular in the case of a carrier aggregation in the uplink and downlink frequency ranges.

The proposed method advantageously results in a reliable and fast identification of a frequency band or channel in which a signal is being transmitted. This information can be used, for example, to activate frequency-band-specific or channel-specific amplifier devices. This information can also be used to control switching devices for the creation of signal paths between the terminal-device-side interface and the antenna-side interface, in particular in order to adjust a desired signal path for transmission.

In addition, this advantageously results in an improved identification of a signal in a scenario in which a signal according to a TDD method and also a signal according to an FDD method are transmitted simultaneously since signals transmitted according to these methods can be transmitted simultaneously in the same frequency bands. In this case, the precise channel identification advantageously enables a precise identification of the signal type.

In addition, it is advantageous that in the case of an intraband carrier aggregation, the signal power in each individual channel in which a signal is being transmitted can be determined, whereby on the one hand a precise identification of the channel and also, as explained in more detail below, a later monitoring of the channel are made possible. In particular in the case of the said intraband carrier aggregation, the signal powers transmitted in different channels of a single frequency band can also be reliably determined. This is in particular advantageous when one of the signals in the frequency band is transmitted to a far-away base station and a further signal in the same frequency band is transmitted to a base station that is not so far away, whereby the powers can be of different magnitudes.

In addition, this advantageously results in a simple adaptation of the circuit arrangement to the standards used in different countries. For this purpose, frequencies of the reference signal and cut-off frequency which are to be adjusted country-specifically can be easily adjusted in the filter device by the control and evaluation device. These frequencies can be stored, for example, in a storage device of the control and evaluation device or a storage device connected/connectable to the control and evaluation device.

In addition, it is advantageous that the circuit arrangement can be designed to be adaptive. Thus, for example, during operation of the circuit arrangement, it can be determined how often a frequency band or a channel is used for signal transmission by specific frequency bands or channels, wherein at the start of a frequency band or channel identification, the frequency bands or channels most frequently used are first examined for a transmitted signal. As a result, for example, the operation of the circuit arrangement can be adapted to a specific terminal device, as a result of which the time period for establishing a desired signal transmission quality is reduced.

In addition, it is advantageous that a detector for determining the signal property only needs to be designed for operation within a prespecified band range and thus not over a large, in particular the entire, band range. This advantageously reduces costs in the production of the circuit arrangement.

In a further embodiment, the circuit arrangement comprises a device for determining a signal power of the filtered signal. This device can also be referred to as a power detector. In this case, the signal power can form the signal property to be evaluated or one of the signal properties to be evaluated and, in particular, can be represented by a signal level. The device for determining the signal power can comprise, in particular, a rectifier or a rectifier and also a comparator.

It is possible for the device to generate an output signal, in particular a voltage signal, the amplitude of which represents the signal power/level. This can take place in particular on the basis of characteristic curves, wherein the device has a device-specific input-power/output-voltage characteristic curve. An analog output signal can of course be digitized, for example by an A/D converter. This advantageously results in a simple and reliable determination of a signal property and thus a simple and reliable identification of the frequency band.

In a further embodiment, a cut-off frequency of the filter device can be adjusted, in particular by the previously mentioned control device. If the filter device is a bandpass filter, the lower and upper cut-off frequencies and thus the bandwidth and the center frequency of the bandpass can in particular be adjusted. For example, a bandwidth of the bandpass filter, i.e., a width of the frequency range between the lower and the upper cut-off frequencies, may be 10 MHz. In particular, the cut-off frequencies of the bandpass filter can be selected in such a way that they include a frequency range which contains the previously mentioned difference component but no further components of the output signal of the mixer. If the center frequency and the bandwidth of a bandpass filter are prespecified, the reference frequency can be selected in such a way that the desired difference component is filtered out of the output signal of the mixer.

By adjusting the cut-off frequency, the accuracy of determination of the (carrier) frequency of the decoupled signal can advantageously be adjusted. The lower the cut-off frequency, the smaller the deviation between the adjusted frequency of the reference signal and the (carrier) frequency of the decoupled signal so that the difference component is provided by the filter device with a level that is higher than the prespecified threshold value. In other words, the cut-off frequency determines by how much the frequencies mentioned can differ if the difference component, i.e., the filtered signal, has a level that is higher than the prespecified threshold value.

In particular, an identification of the frequency band with different sensitivities is thus made possible. If then, for example, a more precise determination of the (carrier) frequency is desired, for example in order to identify a channel in a frequency band, the cut-off frequency of the filter device can be reduced, for example to a prespecified value.

If it is desired to identify a channel in which a signal is being transmitted, it may be necessary to increase the accuracy of determination of the (carrier) frequency, wherein this can be done by reducing the cut-off frequency of the filter device. For example, in a frequency band identification step, the cut-off frequency of the filter device can be adjusted to a first value. The first value can in particular be selected in such a way that the cut-off frequency corresponds to the bandwidth of the frequency band that is to be identified and has the greatest bandwidth.

In addition, different frequencies of the reference signal can be adjusted in the frequency band identification step, for example center frequencies of the frequency bands in which a signal can be transmitted. Such a center frequency can be a frequency assigned to the frequency band that is to be identified. If it is then detected for one of these adjusted frequencies that the signal power of the filtered signal is greater than the prespecified threshold value, the frequency band to which the currently adjusted frequency of the reference signal is assigned can be identified as a frequency band in which a signal is being transmitted. In addition, in a channel identification step, a cut-off frequency of the filter device can be adjusted to a second value that is less than the first value, in particular less than the bandwidth of the identified frequency band. In addition, different frequencies of the reference signal can be adjusted in the channel identification step, these frequencies being in the identified frequency band. It is conceivable, for example, for precisely one frequency, for example a center frequency, or for a plurality of frequencies to be assigned to each channel in a frequency band. These frequencies or a selection thereof can then be adjusted in the channel identification step. If it is then detected for one of these adjusted frequencies that the signal power of the filtered signal is greater than the prespecified threshold value, the channel to which the currently adjusted frequency of the reference signal is assigned can be identified as a channel in which a signal is being transmitted.

It is of course conceivable that after the identification of a channel in which a signal is being transmitted, a new identification of a further frequency band or of a further channel in which a further signal is being transmitted is started. In this way, different channels or frequency bands which are used in an intraband or interband carrier aggregation can advantageously be identified.

If different frequencies of the reference signal are adjusted for identification purposes, they can be adjusted for a prespecified time period, for example, 50 μs, before the next following frequency is then adjusted. The prespecified time period can be adjusted as above with respect to the time period for determining the signal property.

The adjustability of the cut-off frequency advantageously results in the identification of a frequency band or of a channel with adjustable accuracy.

In a further embodiment, the means for providing the reference signal comprises a phase-locked loop or is designed as such. The phase-locked loop can denote an electronic circuit arrangement which influences the phase position and, associated therewith, the frequency of a variable oscillator via a closed control loop in such a way that the phase deviation between an external reference signal and the oscillator or a signal derived therefrom is as constant as possible. The structure of a phase-locked loop is known to the person skilled in the art. In particular, the phase-locked loop can comprise a phase comparator, a loop filter and a controllable oscillator. In addition, the phase-locked loop can comprise one or more frequency dividers. An input signal of the phase-locked loop can in particular be a sinusoidal signal of a prespecified frequency or a sinusoidal signal divided by a frequency divider with a prespecified dividing factor. In this case, the sinusoidal signal can be generated by a corresponding generating device, for example, an oscillator, in particular a quartz oscillator. For example, the control device can comprise such a generating device.

In addition, a dividing factor of the frequency divider for the sinusoidal signal can also be adjusted by the control device. In addition, a dividing factor of a frequency divider for a feedback output signal of the controllable oscillator can also be adjusted by the control device. A desired frequency of the reference signal which corresponds to the output signal of the controllable oscillator can thus be adjusted in particular by adjusting the dividing factors.

This advantageously results in an easily implementable and reliable and also precise generation of the reference signal.

In a further embodiment, the circuit arrangement comprises at least one control device for adjusting the frequency of the reference signal and/or for adjusting the cut-off frequency of the filter device. This and corresponding advantages have already been explained above.

In a further embodiment, the circuit arrangement comprises at least one device for signal transmission detection. By means of the device for signal transmission detection, it can be detected whether one or more uplink or downlink signals are being transmitted via the circuit arrangement. The device for signal transmission detection can be coupled in terms of signal technology to a signal path for transmitting an uplink and/or downlink signal, in particular via a further signal coupler of the circuit arrangement. Alternatively, however, it is also possible to provide a galvanic connection between the signal path and the device for signal transmission detection.

The device for signal transmission detection can in particular carry out a band-nonspecific detection of a signal transmission. In other words, it can be detected whether a signal is being transmitted via the circuit arrangement, wherein however no frequency band this transmission is taken into account.

If the device for signal transmission detection detects that a signal is being transmitted via the circuit arrangement, the identification of the frequency band or of the channel in which the signal is being transmitted can be started. In particular, the device for signal transmission detection can generate a start signal for starting this identification. The device for signal transmission detection can be formed at least partially by the evaluation device. In addition, this device can comprise at least one rectifier or a rectifier and at least one comparator.

This advantageously results in an identification only taking place when a signal is actually being transmitted via the circuit arrangement. In this way, energy consumption and the computing power of the circuit arrangement to be provided can be reduced.

In a further embodiment, the circuit arrangement comprises at least one switching element. This switching element can be designed as a switch, for example, an SPDT (single-pole double-throw) switching element. In a first switching state of the switching element, a first port of the signal coupler is connected to the mixer and, in a further switching state of the switching element, a further port of the signal coupler is connected to the mixer, in particular to the input port of the mixer. As a result, it can advantageously be determined easily and reliably whether an uplink or a downlink signal is being transmitted via the circuit arrangement.

It is possible for the different ports of the signal coupler to be isolated from one another by more than a prespecified amount. If, for example, an uplink signal is transmitted via a signal path of the circuit arrangement and decoupled therefrom by the signal coupler, the signal power of the decoupled signal provided at the first port of the signal coupler can be greater than the signal power of the signal provided at the further port. If a downlink signal is transmitted via the signal path, the signal power of the signal provided at the further port can correspondingly be greater than the signal power of the signal provided at the first port.

For example, by changing the switching state, it can be detected whether an uplink or downlink signal is being transmitted. If, for example, a signal power of the filtered signal is detected that is greater than a prespecified threshold value, a switching state of the switching element can be changed. Depending on the output switching state, an uplink signal can be detected if the signal power of the filtered signal increases or decreases. A downlink signal can be detected if the signal power of the filtered signal decreases or increases. This detection can in this case be carried out before but also during a band identification step.

In addition, the (further) identification of the frequency band or of a channel in which the signal is being transmitted can be carried out as a function of the information whether an uplink signal or a downlink signal is being transmitted. For example, if an uplink signal has been detected, the frequencies of the reference signal can be adjusted in the band identification step or in the channel identification step to frequencies that are assigned to frequency bands or channels for the transmission of uplink signals. Correspondingly, if a downlink signal has been detected, the frequencies of the reference signal can be adjusted in the band identification step or in the channel identification step to frequencies that are assigned to frequency bands or channels for the transmission of downlink signals.

This advantageously results in a faster identification of a frequency band or of a channel in which a signal is being transmitted.

In a further embodiment, the circuit arrangement comprises a bypass device, wherein a signal is transmitted between the signal coupler and the mixer via the bypass device. The bypass device can comprise a bypass switching element, which can be designed as a switch, for example. In a first switching state of this switching element, the signal can be transmitted unattenuated or unamplified. In a further switching state, the signal can be transmitted with a prespecified, in particular also adjustable, amplification or attenuation. In this case, the bypass device can comprise a corresponding amplifier or attenuator device.

As a result, a reliability of identification can advantageously be increased, namely in particular by an amplification of weak decoupled signals. It is also advantageously possible to increase operational reliability during identification, namely in particular by attenuating excessively strong decoupled signals. In particular, an amplification by the amplifier or attenuator device of the bypass device serves to extend the voltage/power characteristic of the device mentioned for determining the signal power of the filtered signal. Such an extension can be necessary, in particular due to the dynamics of the transmission signals, in order to be able to reliably process different level ranges.

In a further embodiment, at least one channel in which the transmitted signal is being transmitted is additionally identifiable as a function of the adjusted frequency and of the at least one signal property. This and corresponding advantages have already been explained above.

In a further embodiment, the channel can additionally be identified as a function of the adjusted cut-off frequency. This and corresponding advantages have already been explained above.

In a further embodiment, a channel bandwidth of the channel is determinable as a function of a plurality of adjusted frequencies and of the at least one signal property.

This and corresponding advantages are explained in more detail below.

Further proposed is a method for identifying a frequency band in which an uplink or downlink signal is being transmitted, wherein a decoupled uplink or downlink signal is provided or the corresponding signal is decoupled. The signal can in particular be decoupled from a signal path of the circuit arrangement. In addition, at least one reference signal of a prespecified frequency is provided, in particular by means of the device for providing a reference signal. In addition, the decoupled signal and the reference signal are mixed, in particular by the mixer. In addition, the mixed signal is filtered, in particular by the filter device. In addition, at least one signal property of the filtered signal is determined, in particular by means of the evaluation device or a device for determining a signal property. In particular, a level of the filtered signal can be determined. In addition, a frequency band or a channel in which the transmitted signal is being transmitted is identified as a function of the frequency of the reference signal and of the at least one signal property of the filtered signal.

The method can here be carried out with a device according to any one of the embodiments disclosed in this disclosure. The device is thus in particular configured in such a way that a method according to any one of the embodiments described in this disclosure can be carried out with the device.

For example, a signal power of the filtered signal may be determined and the frequency band to which the adjusted frequency of the reference signal is assigned may be identified as a frequency band by transmitting the signal.

In the method, it is possible for different frequencies of the reference signal to be adjusted one after the other, in particular in that the device for generating the reference signal is operated/controlled accordingly. In this case, it is possible, in particular, for different frequencies of the reference signal to be adjusted in such a way that they differ from one another by more than or by precisely a prespecified minimum amount, wherein the minimum amount may, for example, be 200 kHz. For each of these adjusted frequencies, the signal power of the filtered signal can then be determined, wherein a frequency band in which a signal is being transmitted is identified only if the signal property for an adjusted frequency of the reference signal assigned to this frequency band satisfies a prespecified criterion, for example, the signal power for an adjusted frequency of the reference signal assigned to this frequency band exceeds a prespecified threshold value. Of course, it is conceivable for a plurality of frequency bands, in each of which signals are being transmitted, to be identified. For this purpose, the method may, for example, be restarted after the identification of a frequency band, but wherein other frequencies of the reference signal are then adjusted.

In this case, an assignment, in particular a prespecified assignment, can exist between adjustable frequencies of the reference signal and frequency bands, which assignment is used for identification. An assignment between adjustable frequencies of the reference signal and channels of the frequency bands can also exist, which assignment, as explained in more detail below, can be used to identify a channel. If a frequency band or a channel in which a signal is being transmitted has been identified, the correspondingly adjusted frequency of the reference signal and, if applicable, also the detected signal power can be stored, for example in a memory device. In this case, the memory device can be a memory device of the control and evaluation device. This makes it possible for the correspondingly stored frequency of the reference signal to be retrieved and adjusted easily for a later check or monitoring as to whether a signal is still being transmitted in the frequency band or channel.

In a further embodiment, frequency-range-specific or channel-specific reference signals of different frequencies are generated, wherein in each case, the reference signals are mixed with the decoupled signal, the mixed signals are filtered and at least one signal property of the mixed signals is determined, wherein the frequency band or the channel is determined as a function of the frequency-range-specific or channel-specific signal properties. This and corresponding advantages have already been explained above.

In a further embodiment, at least one cut-off frequency of the filter device is changed. This and corresponding advantages have already been explained above.

It is possible, for example, for both the frequency of the reference signal and the cut-off frequency to be changed. For example, the cut-off frequency can be adjusted to a frequency-band-specific cut-off frequency if a frequency of the reference signal is adjusted that is assigned to this frequency band. For this purpose, a previously known assignment between a frequency band and a cut-off frequency can exist.

In particular, the cut-off frequency can be changed, more particularly reduced, if a frequency band has been identified and a channel identification of a channel of the identified frequency band subsequently takes place, wherein the identified frequency band comprises a plurality of channels. Prespecified frequencies, in particular channel-specific frequencies, of the reference signal can also be adjusted in the case of channel identification. In addition, prespecified cut-off frequencies, for example channel-specific cut-off frequencies, can be adjusted. If, for example, a frequency band has been identified by transmitting a signal, the frequency of the reference signal for channel identification can subsequently only be adjusted to frequencies of this frequency band. As explained above, these frequencies adjusted for channel identification can differ from one another by a prespecified minimum amount or by more than this prespecified minimum amount.

In addition, it is conceivable that for channel identification, a plurality of runs of the method are carried out, the previously mentioned minimum amount and/or the cut-off frequency being reduced in successive runs.

The group of frequencies to be adjusted of the reference signal can also be determined in one run depending on the cut-off frequencies used in the previous run. For example, frequencies in a channel identification run can only be adjusted from a band range which comprises as the center frequency the frequency of the reference signal that was adjusted in the previous run and for which a transmitted signal had been detected, wherein a bandwidth of this band range corresponds to the cut-off frequency in the previous run or is determined as a function thereof.

Overall, however, various strategies for adjusting the frequencies of the reference signal and for adjusting the cut-off frequency of the filter device are conceivable in order to identify in a desired manner one or more frequency bands and/or one or more channels in which a signal is being transmitted.

In a further embodiment, a frequency band is identified, wherein a channel of this frequency band is subsequently identified. This and corresponding advantages have already been explained above.

In particular, in order to identify a frequency band in which a signal is being transmitted, band identification frequencies and, if applicable, band identification cut-off frequencies of the filter device can be adjusted. A band identification cut-off frequency can be 60 MHz, for example. It can be assumed here that frequency bands have fixed and prespecified bandwidths. Of course, other cut-off frequencies can also be adjusted, for example as a function of bandwidths that can be taken from a frequency band table of the mobile radio.

For channel identification, channel identification frequencies and, if applicable, channel identification cut-off frequencies of the filter device can be adjusted in a corresponding manner. A channel identification cut-off frequency may be 200 kHz, for example. It can be assumed here that channels can have different bandwidths, for example, 1.4 MHz, 5 MHz or 10 MHz. Of course, however, other cut-off frequencies may also be adjusted, for example as a function of bandwidths which can be taken from a frequency channel table of the mobile radio.

Here, the channel identification frequencies and, if applicable, also the channel identification cut-off frequencies can be frequency-band-specific. This can mean that for different frequency bands in which a signal is being transmitted, specific, prespecified channel identification frequencies and, if applicable, different channel identification cut-off frequencies are adjusted in each case.

In a further embodiment, a channel bandwidth of the channel is identified.

If, for example, a frequency band has been identified, a channel and/or a channel bandwidth can then be identified by sequentially adjusting all segment frequencies in a group of segment frequencies from the identified frequency band and a segment cut-off frequency and then determining the at least one signal property of the filtered signal for each adjusted segment frequency. The segment cut-off frequency of the filter device here defines a bandwidth of a segment. In other words, the frequency band can be divided into segments, which are then individually checked for a signal transmission. A segmented or quantized frequency band is thus checked. This check can also be referred to as a grid check.

In particular, the segment frequency, starting from the band start frequency, can be increased stepwise up to the band end frequency, for example by a prespecified frequency increment, wherein in each step, the at least one signal property of the filtered signal is then determined for the corresponding segment. The prespecified frequency increment may be 200 kHz, for example. The segment cut-off frequency preferably corresponds to the frequency increment.

If the signal property satisfies a prespecified criterion, for example, if the signal power is greater than a prespecified threshold value, it is possible to identify the corresponding segment as a segment in which a signal is being transmitted. If the criterion is satisfied only for a single segment and for none of the adjacent segments, the channel can be identified as that segment and the channel bandwidth as the segment bandwidth.

If the signal property satisfies the prespecified criterion for a plurality of adjacent segments, it is possible to identify the channel as the totality of the segments and the channel bandwidth as the sum of all segment bandwidths of these adjacent segments.

It is thus also possible for a plurality of channels in the frequency band and for a plurality of corresponding channel bandwidths to be identified, for example in the case of an intraband carrier aggregation.

In other words, by adjusting the segment cut-off frequency of a low-pass filter device or the bandwidth and also the center frequency of a bandpass filter device, the bandwidth of the decoupled signal can be quantized, i.e., divided into segments. The lower the segment cut-off frequency, the more precisely the bandwidth of the channel can be determined. The lowest segment cut-off frequency that can be adjusted and which may be 200 KHz, for example, thus enables the most precise determination of the bandwidth of the channel. In the case of a segment cut-off frequency of 200 kHz, one is in the channel spacing of mobile radio. Other, in particular higher, segment cut-off frequencies lead to a different quantization and thus to a different accuracy.

This advantageously results in a simple and fast identification of a channel and/or a channel bandwidth.

In a further embodiment, a monitoring of at least one signal property of the transmitted signal is carried out after the identification of a frequency band or of a channel in which a signal is being transmitted. This signal property may, for example, be the signal power of the correspondingly filtered signal. For example, the frequency for which the frequency band to be monitored was detected can be adjusted continuously or at prespecified time intervals, in particular periodically, as the frequency of the reference signal. In addition, the signal power of the filtered signal can be determined, wherein a continuous transmission of the signal is detected when the signal power is greater than the prespecified threshold value or greater than a further prespecified threshold value. In addition, a terminated or interrupted signal transmission can be detected if the signal power is less than the prespecified threshold value or the further prespecified threshold value. If, for example, a terminated or interrupted signal transmission is detected, amplifier devices of the circuit arrangement can be correspondingly controlled, for example, deactivated. Even signal paths which served for transmission of the signal can be interrupted. Monitoring can also be referred to as monitoring mode. The monitoring advantageously results in an improved operation of the circuit arrangement, in particular since the operation, for example, the operation of amplifier devices and/or the creation of signal paths for transmission, can be adapted to the current transmission state.

Alternatively or cumulatively, the identification of a further frequency band or of a channel or a further channel is started. This can also be referred to as scanning mode.

The identification of a further frequency band or of a further channel advantageously results in an improved operation of the circuit arrangement, namely an operation adapted to the transmission of a plurality of signals. The identification of a channel advantageously results in a more precise determination of a frequency range in which a signal is being transmitted, and thus also an operation of the circuit arrangement adapted thereto.

In a further embodiment, the monitoring and the identification of a further frequency band or (further) channel are carried out sequentially or simultaneously. In other words, the circuit arrangement can be alternately operated in monitoring mode and in identification mode. This advantageously results in an improved adaptation of the operation to the current transmission state.

However, if the circuit arrangement comprises suitable means for carrying out monitoring and identification simultaneously, e.g., a monitoring and a detection section as explained in more detail below, the monitoring and the identification of a further frequency band or (further) channel can also be carried out simultaneously.

This advantageously results in a faster identification.

BRIEF DESCRIPTION OF DRAWINGS

The invention is explained in more detail with reference to exemplary embodiments. The figures show.

In the following, the same reference sign elements denote the same or similar technical features.

DETAILED DESCRIPTION OF THE PREFERRED EMBODIMENTS

Figure 1:
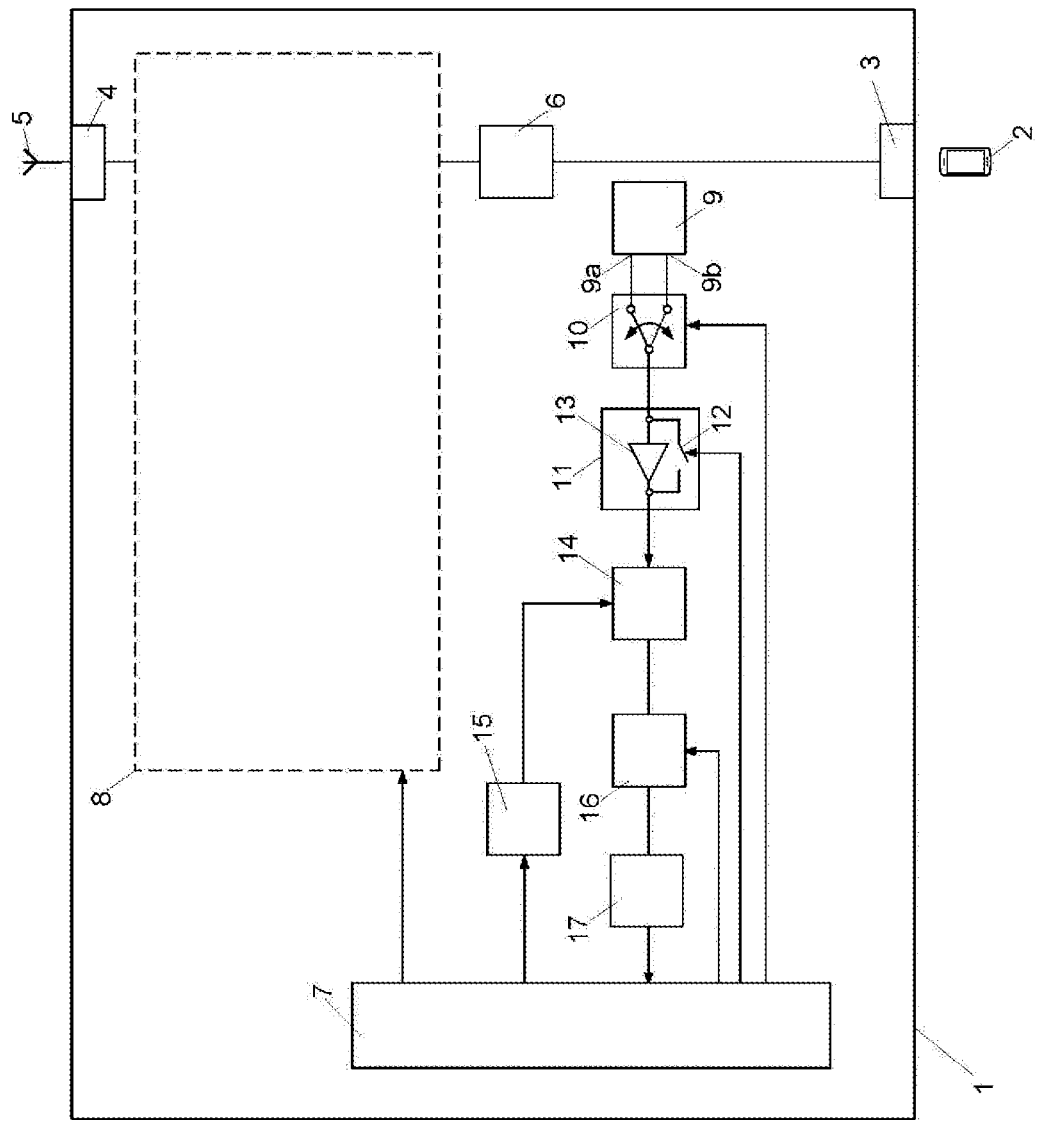
FIG. 1 a schematic block diagram of a circuit arrangement according to the invention, FIG. 2 a schematic block diagram of a circuit arrangement according to the invention in a further embodiment, FIG. 3 a schematic block diagram of a circuit arrangement according to the invention in a further embodiment, FIG. 3A a schematic block diagram of a circuit arrangement according to the invention in a further embodiment, FIG. 4 a schematic block diagram of a device for generating a reference signal, FIG. 5 a schematic representation of frequency ranges, FIG. 6 a schematic representation of a frequency range with a plurality of channels, FIG. 7 a schematic flow chart of a method according to the invention, and FIG. 8 a schematic flow chart of a method according to the invention in a further embodiment.

FIG. 1 shows a schematic block diagram of a circuit arrangement 1 according to the invention. A terminal device 2, which may be a cell phone, for example, is shown. The circuit arrangement 1 comprises a terminal-device-side interface 3, wherein signals can be transmitted between the terminal device 2 and the circuit arrangement 1 by means of the terminal-device-side interface 3. The terminal-device-side interface 3 can comprise or form a wireless coupler. The circuit arrangement 1 further comprises an antenna-side interface 4, wherein signals can be transmitted between an antenna 5 and the circuit arrangement 1 by means of the antenna-side interface 4.

In particular, so-called uplink signals can be transmitted from the terminal device 2 to the antenna 5 via the circuit arrangement 1. This transmission can be initiated by the terminal device 2 itself or be requested by a base station. In addition, so-called downlink signals can be received from the antenna 5 and then transmitted via the circuit arrangement 1 to the terminal device 2.

The circuit arrangement further comprises an attenuation device 6. This device can preferably be an attenuation device 6 with an adjustable attenuation factor. In addition, the circuit arrangement 1 comprises a control and evaluation device 7, which may, for example, be designed as a microcontroller or comprise such a microcontroller.

A signal-line and processing section 8 of the circuit arrangement 1 is shown schematically. This section 8 can comprise devices for amplifying a signal transmitted via the circuit arrangement 1, switching devices for creating signal paths for transmitting uplink or downlink signals, and also filter devices, in particular in the form of multiplexers. Of course, the section 8 can also comprise further devices.

In addition, the circuit arrangement 1 comprises a signal coupler 9, by means of which a signal can be decoupled from a signal path between the terminal-device-side interface 3 and the attenuator device 6. Of course, it is also possible to arrange the signal coupler 9 at other locations in the circuit arrangement 1 and to accordingly decouple uplink or downlink signals.

The signal coupler 9 has a first antenna-side port 9a and a second terminal-device-side port 9b. The signal coupler 9 can in particular be a direction-sensitive signal coupler. Due to the directional sensitivity, a power of a signal that is decoupled at a first port of the signal coupler, for example, an antenna-side port, can be greater than the power of a signal of the same signal strength that is decoupled at a first port of the signal coupler, for example, an antenna-side port.

In addition, the circuit arrangement 1 comprises a switching element 10, which may be designed as a switch. The switching element 10 can assume various switching states. In this case, the ports 9a, 9b of the signal coupler 9 are connected to different input ports of the switching element 10. An output port of the switching element 10 is connected to an input port of a bypass device 11 of the circuit arrangement 1. The bypass device 11 comprises a disconnector element 12 and an amplifier device 13, wherein the disconnector element 12 and the amplifier device 13 are connected in parallel. If the disconnector element 12 assumes a closed state, a signal is transmitted unamplified from the input port of the bypass device 11 to an output port of the bypass device 11. If the disconnector element 12 assumes an open state, the signal being transmitted between the ports of the bypass device 11 is amplified by the amplifier device 13. The disconnector element 12 can be designed as a single-pole switch, which can assume a closed or an interrupted state.

It is conceivable for the bypass device 11 alternatively to comprise two switchover elements, wherein the output port of the bypass device 11 is connected via a first switchover element to an output port of the amplifier device 13 and the input port of the bypass device 11 is connected via a further switchover element to the input port of the amplifier device 13. If a first switching state of both switchover elements is adjusted, a signal is transmitted unamplified from the input port of the bypass device 11 to the output port of the bypass device 11, namely via a signal path that is arranged in parallel to the amplifier device 13. If a first switching state of both switchover elements is adjusted, a signal is transmitted via the amplifier device 13 from the input port of the bypass device 11 to the output port of the bypass device 11.

In addition, the circuit arrangement 1 comprises a mixer 14, wherein a first input port of the mixer 14 is connected to the output port of the bypass device 11 and a further input port of the mixer 14 is connected to a device 15 for generating a reference signal. As described below in particular with reference to the embodiment shown in FIG. 4, this device 15 can comprise or form a phase-locked loop.

In this case, the reference signal is in particular a harmonic signal, in particular a sinusoidal signal, of an adjustable frequency. The circuit arrangement 1 here comprises this device 15 for generating the reference signal.

An output port of the mixer 14 is connected to a filter device 16 for low-pass filtering of the mixed signal which is present at the output port of the mixer 14. The filter device 16 is here a filter device with an adjustable cut-off frequency.

In addition, the circuit arrangement 1 comprises a device 17 for determining a signal power of the filtered signal which is provided by the filter device 16. Not shown is an A/D converter which can digitize an output signal of the device 17, wherein the A/D converter can be part of the control and evaluation device 7.

It is further shown that the control and evaluation device 7 adjusts the switching element 10, in particular its switching states. It is also shown that the control and evaluation device 7 controls an operation, in particular a state, of the bypass device 11. In addition, a cut-off frequency of the filter device 16 can be adjusted by the control and evaluation device 7. Likewise, the device 15 for generating a reference signal can be controlled by the control and evaluation device 7 in such a way that a desired frequency of this reference signal is adjusted.

In addition, the signal power of the filtered signal can be evaluated, in particular compared with a prespecified threshold value, by the control and evaluation device 7.

As explained in more detail below, a prespecified frequency of the reference signal is adjusted in this way. In addition, this reference signal is then mixed with the decoupled signal. The mixed signal is then filtered, wherein the level of the filtered signal is determined. In addition, as a function of the adjusted frequency of the reference signal and the signal power, a frequency band FB1, FB2, FB3 (see FIG. 5) is identified in which an uplink or downlink signal is being transmitted.

In addition, it can also be identified whether an uplink or a downlink signal is being transmitted via the circuit arrangement 1. If, for example, it is detected that the signal power of the filtered signal is greater than a prespecified threshold value, it is possible to change a switching state of the switching element 10. For example, if the switching state is changed in such a way that the antenna-side input port of the switching element 10 is no longer connected to the output port of the switching element 10 but the terminal-device-side input port is connected thereto, and the signal power of the filtered signal is increased, it is possible to identify that an uplink signal is being transmitted. If the signal power decreases, it is possible to identify that a downlink signal is being transmitted. For example, if the switching state is changed in such a way that the terminal-device-side input port of the switching element 10 is no longer connected to the output port of the switching element 10 but the antenna-side input port is connected thereto, and the signal power of the filtered signal is increased, it is possible to identify that a downlink signal is being transmitted. If the signal power decreases, it is possible to identify that an uplink signal is being transmitted.

If an excessively high signal power is detected in an open state of the disconnector element 12, a closed state of the disconnector element 12 can be adjusted, in particular in order to avoid a load on the components due to excessively high signal powers and an overdriving of the amplifier device, which can lead to the undesired formation of harmonics.

It is further shown that the control and evaluation device 7 controls an operation, in particular a state, of the section 8, for example by activation/deactivation of amplifier devices and by adjusting switching states of switching elements of the section 8. The operation of the section 8 can be controlled, for example, as a function of the identified frequency band FB1, FB2, FB3.

Figure 2:
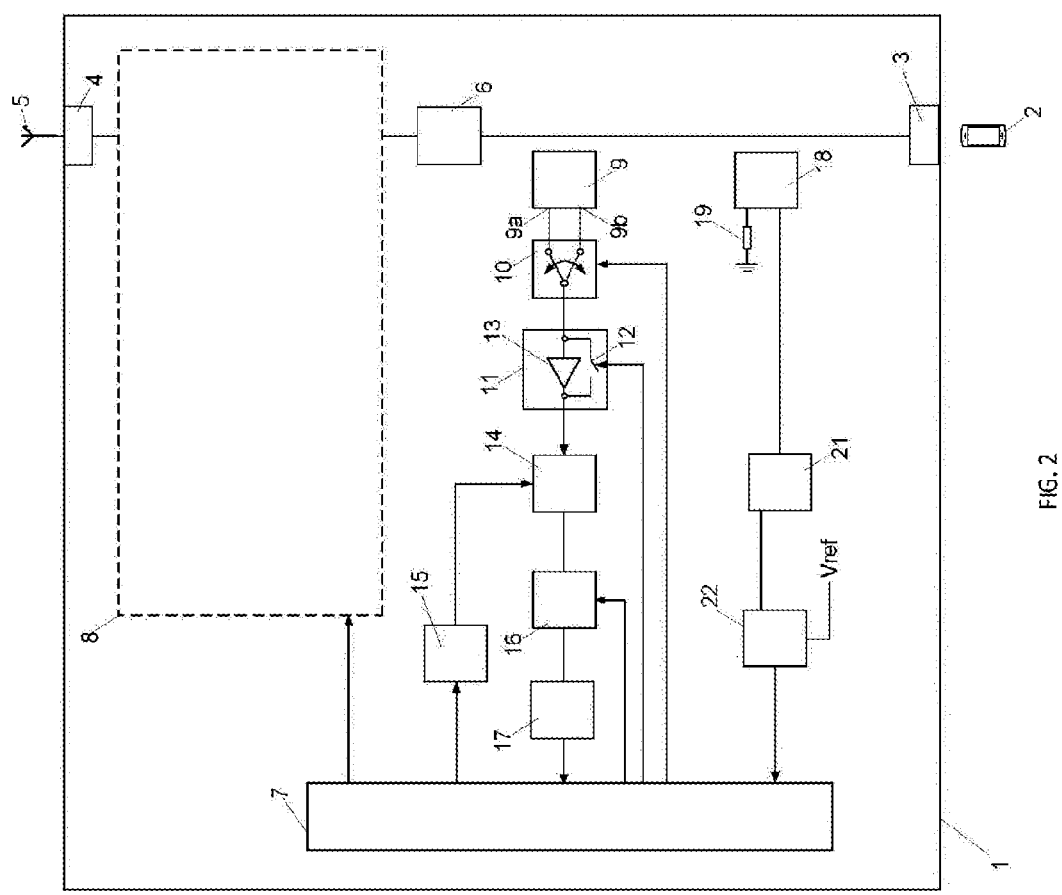

FIG. 2 shows a schematic block diagram of a circuit arrangement 1 according to the invention in a further embodiment. The circuit arrangement 1 shown in FIG. 2 is in this case designed substantially like the circuit arrangement 1 shown in FIG. 1, as a result of which reference is made to the corresponding statements. In contrast to the circuit arrangement 1 shown in FIG. 1, the embodiment shown in FIG. 2 comprises a device for signal transmission detection. This device comprises a further signal coupler 18, by means of which a signal is decoupled from a signal path between the terminal-device-side interface 3 and the attenuator device 6. This signal coupler 18 can be designed as a directional coupler which decouples a (small) part of the signal power of the signal from the signal path. A first output port of this further signal coupler 18 is in this case connected to a reference potential, in particular a ground potential, via a resistance element 19 which forms a matching resistor and can have a prespecified resistance value, for example, 50 ohms. A further output port of the further signal coupler 18 is connected to a detector device 21, for example via an amplifier device (not shown). This detector device 21 determines a signal power, in particular by generating a voltage signal whose amplitude is proportional to the signal power. The output signal representing the signal power is then transmitted to a comparator device 22. A reference voltage Vref, which forms a comparative threshold value of the comparator device 22, is selected in such a way that a noise power of the detector device 21 does not lead to the generation of a detection signal by the comparator device 22. The sensitivity of detection of a signal transmission depends on the level of the reference voltage Vref. The closer the reference voltage Vref is to a voltage that represents the noise power and is generated by the detector device 21, the weaker the signals that can be detected. If the output signal that represents the signal power and is generated by the detector device 21 is equal to or greater than the reference voltage Vref, the comparator device 22 generates the detection signal and transmits it to the evaluation device 7.

If such a detection signal is detected by the control and evaluation device 7, a signal transmission via the circuit arrangement 1 is detected. In particular, it is thus detected whether a signal is being transmitted via the circuit arrangement 1, wherein this detection takes place independently of a frequency band FB1, FB2, FB3 (see FIG. 5). In other words, a frequency-band-independent detection of a signal transmission is carried out. If it is detected in such a way that a signal is being transmitted, the identification of the frequency band FB1, FB2, FB3 or of a channel K1, . . . , K6 can be started by the control and evaluation device 7, in particular by generating a reference signal.

It is possible for the circuit arrangement to comprise a further comparator device (not shown), by means of which the output signal of the detector device 21 can also be compared with a prespecified protection signal level. This protection signal level can be provided in the form of a further reference voltage (not shown), wherein the further comparator device compares the level of the output signal with the protection signal level. In this case, a protection signal is generated if the signal power is greater than the prespecified protection signal power. The protection signal can serve for controlling the attenuation device 6 and can be transmitted to the evaluation device 7 for this purpose. In particular, the attenuation factor of the attenuator device 6 can be increased when the protection signal has been generated. As a result, a load on the circuit arrangement 1 due to excessively high signal powers can be prevented. The prespecified protection signal power may be greater than the start signal power.

Figure 3:
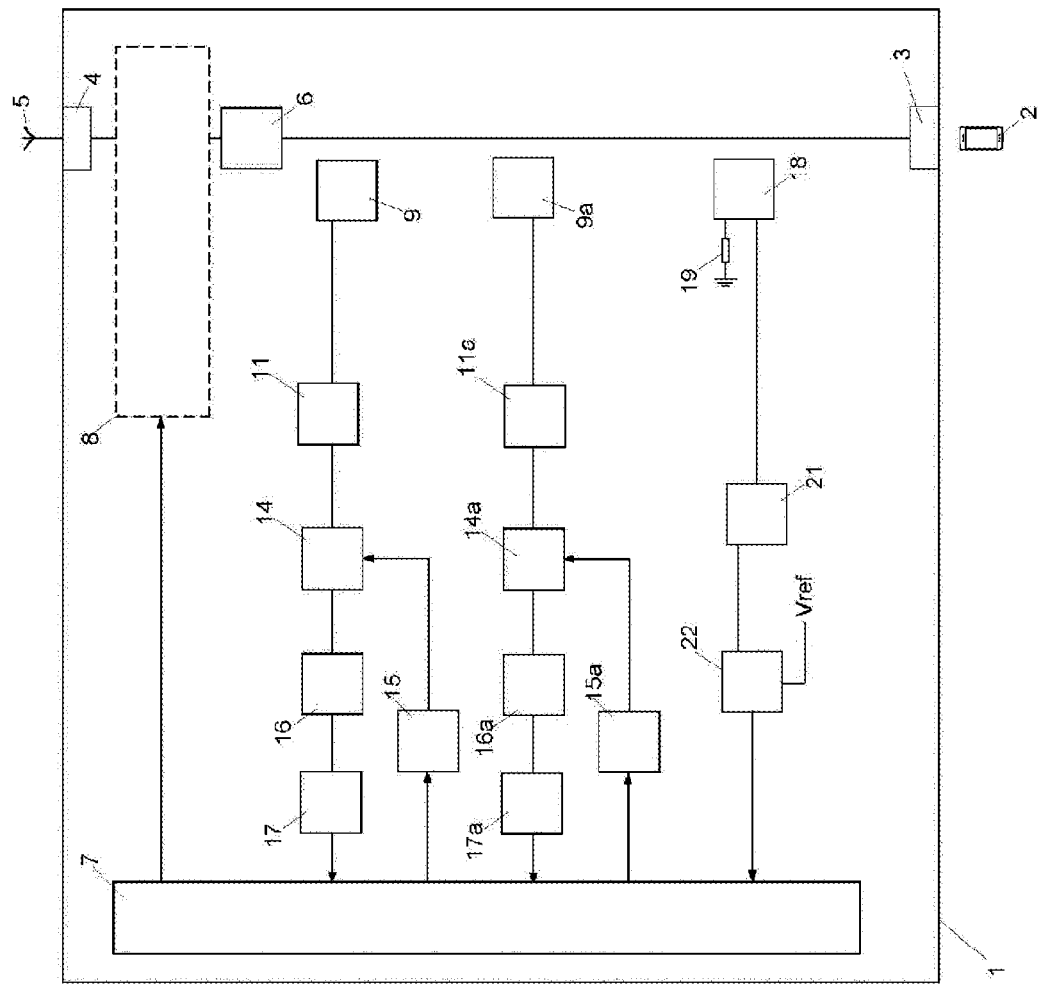

FIG. 3 shows a schematic block diagram of a circuit arrangement 1 according to the invention in a further embodiment. The circuit arrangement 1 shown in FIG. 3 is in this case designed substantially like the circuit arrangement 1 shown in FIG. 2, as a result of which reference is made to the corresponding statements. In contrast to the circuit arrangement 1 shown in FIG. 2, the embodiment shown in FIG. 3 does not comprise a switching element 10 for connecting the signal coupler 9 to the bypass device 11.

In contrast to the embodiment shown in FIG. 2, the circuit arrangement 1 comprises a further signal coupler 9a which can likewise be designed as a directional coupler, a further bypass device 11a, a further mixer 14a, a further filter device 16a, a further device 17a for determining the signal power and a further device 15a for generating a further reference signal.

In this case, the totality of signal coupler 9, bypass device 11, mixer 14, filter device 16, device 17 for determining the signal power and device 15 for generating a reference signal forms a detection section of the circuit arrangement 1.

The totality of the further signal coupler 9a, the further bypass device, the further mixer 14a, the further filter device 16a, the further device 17a for determining the signal power and the further device 15a for generating a reference signal forms a monitoring section of the circuit arrangement 1.

In this case, in terms of circuitry, the detection section is designed identically to the monitoring section. However, the previously explained isolation property of the different ports of the signal coupler 9 with respect to the antenna-side port and the terminal-device-side port can be different from the isolation property of the further signal coupler 9a, in particular reversed. In other words, the signal couplers 9, 9a have different directional sensitivities.

The presence of a detection section and a monitoring section advantageously makes it possible to simultaneously identify frequency bands FB1, FB2, FB3 or channels K1, . . . , K6 of frequency bands FB1, FB2, FB3 in which signals are being transmitted, for example by adjusting different frequencies of the reference signal and cut-off frequencies of the filter device 16. At the same time, an already identified frequency band FB1, FB2, FB3 or an already identified channel K1, . . . , K6 can continue to be monitored, for example by continuous or periodic determination of the signal power of the signal being transmitted in this identified frequency band FB1, FB2, FB3 or channel K1, . . . , K6.

In particular, it is possible to also control the section 8 of the circuit arrangement 1 as a function of the monitoring result. If, for example, it is detected that the output signal of the further device 17a falls below a prespecified threshold value, it can be detected that signal transmission is no longer taking place in the corresponding frequency band FB1, FB2, FB3 or channel K1, . . . , K6. Then, for example, the correspondingly activated amplifier devices of the section 8 can be deactivated.

In addition, the circuit arrangement shown in FIG. 3 can also be used to identify whether an uplink or a downlink signal is being transmitted via the circuit arrangement 1. If, for example, it is detected by the control and evaluation device 7 that the power determined by the device 17 of the detection section is lower than the power determined by the device 17a of the monitoring section, it can be identified that an uplink signal is being transmitted. If, for example, it is detected by the control and evaluation device 7 that the power determined by the device 17 of the detection section is higher than the power determined by the device 17a of the monitoring section, it can be identified that a downlink signal is being transmitted. For this purpose, it may be necessary to adjust the same frequencies of the reference signals generated by the devices 15, 15a.

Figure 3A:
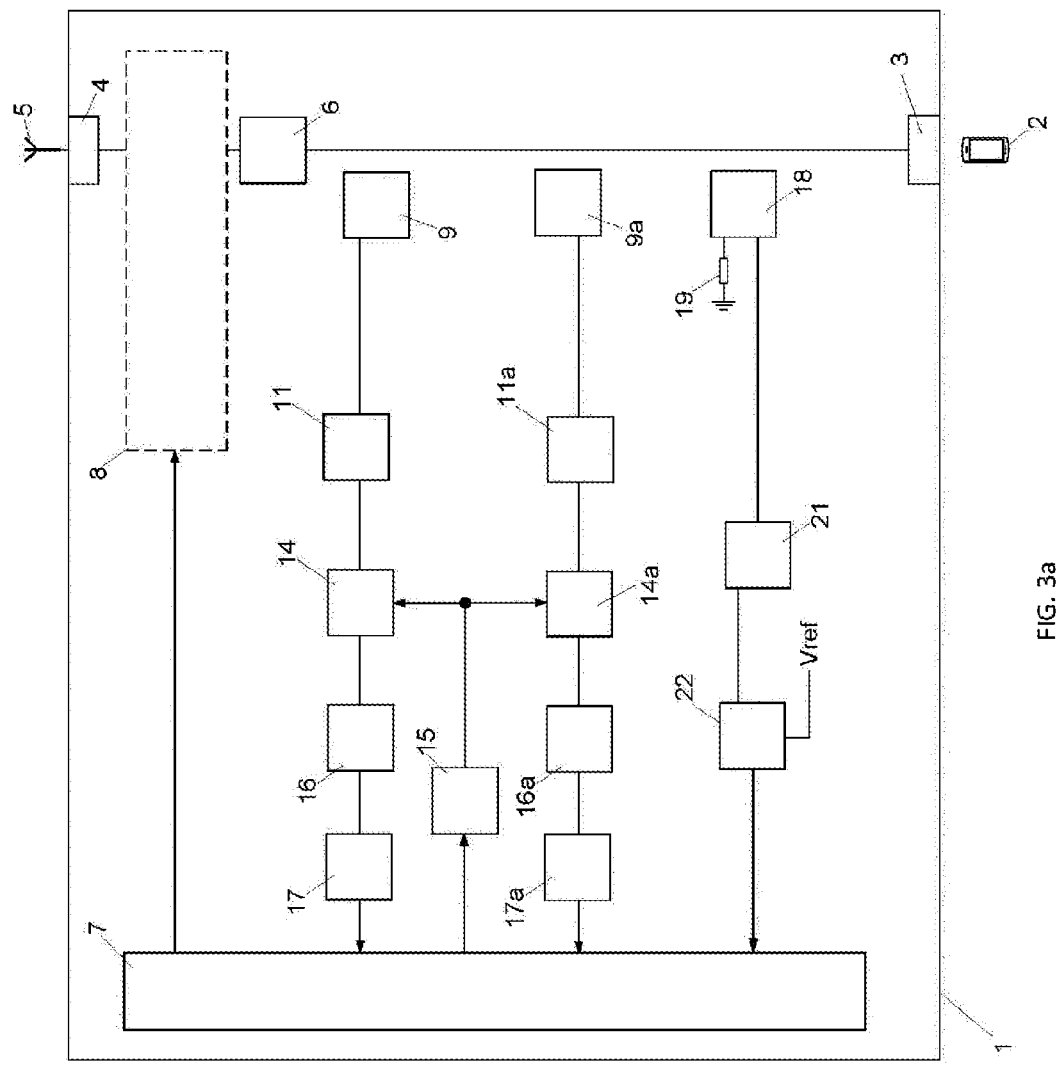

FIG. 3a shows a schematic block diagram of a circuit arrangement 1 according to the invention in a further embodiment. The circuit arrangement 1 shown in FIG. 3a is in this case designed substantially like the circuit arrangement 1 shown in FIG. 3, as a result of which reference is made to the corresponding statements. In contrast to the circuit arrangement 1 shown in FIG. 3, the embodiment shown in FIG. 3a does not comprise a further device 15a for generating a further reference signal. Rather, the reference signal generated by the device 15 for generating the reference signal is transmitted to the mixer 14 and to the further mixer 14a.

In this embodiment, the frequency of the reference signal that is supplied to the mixers 14, 14a cannot be adjusted independently of one another. Thus, the frequency adjustment, as in the embodiment shown in FIG. 3, for a monitoring carried out with the monitoring section shown there cannot take place independently of the frequency adjustment for a detection carried out with the detection section shown there. However, with the embodiment shown in FIG. 3a, as already explained with reference to the embodiment shown in FIG. 3, it can be identified whether an uplink or a downlink signal is being transmitted via the circuit arrangement 1. This is particularly advantageous for signals that are transmitted according to the TDD mode since uplink and downlink signals can have the same frequencies in such a mode. With the section of the circuit arrangement 1 that comprises the further signal coupler 9a, the further bypass device 11a, the further mixer 14a, the further filter device 16a and the further device 17a for determining the signal power, a reliable analysis of uplink signals that are reliably decoupled by the further signal coupler 9 can take place, wherein these uplink signals are in particular not superimposed by excessively strong downlink signals. Accordingly, with the section of the circuit arrangement 1 that comprises the signal coupler 9, the bypass device 11, the mixer 14, the filter device 16 and the device 17 for determining the signal power, a reliable analysis of downlink signals that are reliably decoupled by the signal coupler 9 can take place, wherein these downlink signals are in particular not superimposed by excessively strong uplink signals.

Figure 4:
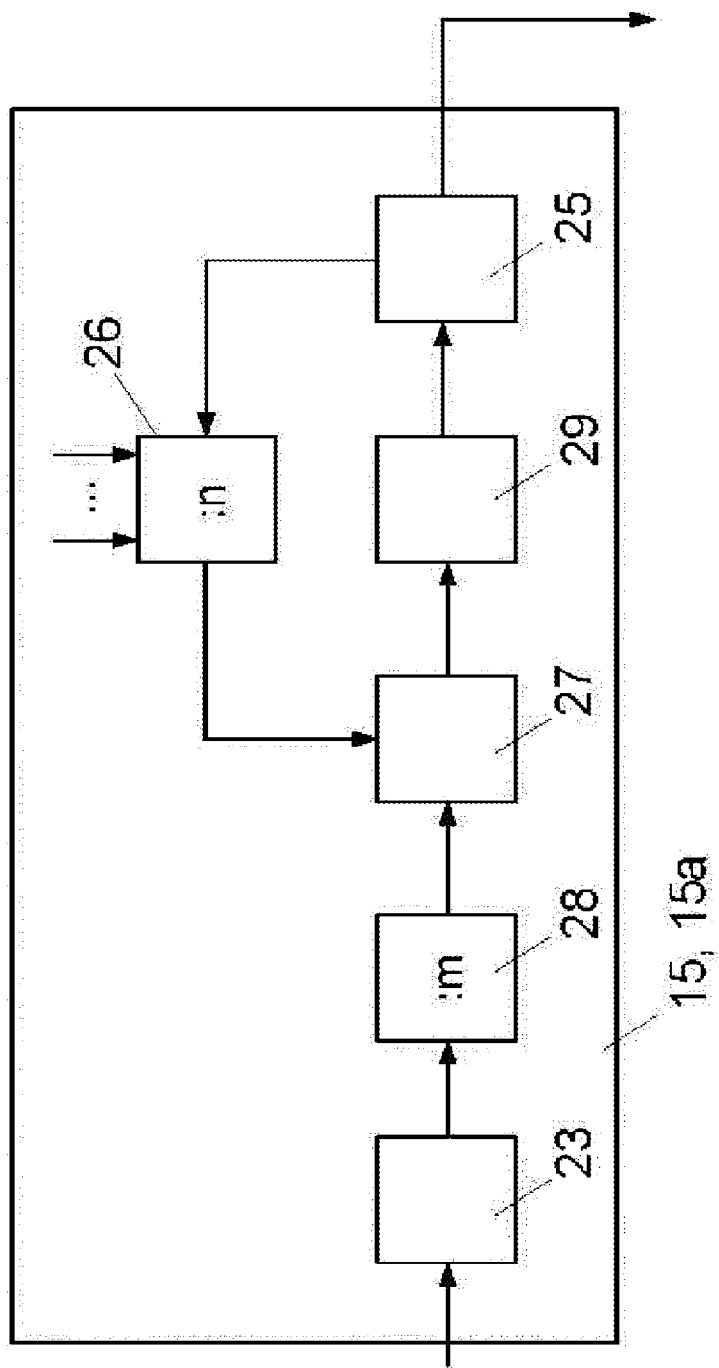

FIG. 4 shows a schematic block diagram of a device 15, 15a for generating a reference signal. The device 15, 15a is designed here as a phase-locked loop. The latter comprises a controllable oscillator 25 which generates the reference signal as an output signal. The output signal of this oscillator 25 is supplied to a frequency divider 26. A dividing factor n of this frequency divider 26 can be adjusted by the control and evaluation device 7. An output signal of this frequency divider 26 is supplied to a phase comparator 27. A further input signal of this phase comparator 27 is provided by a further frequency divider 28, wherein the dividing factor m of this further frequency divider 28 can likewise be adjusted by the control and evaluation device 7. An input signal of this further frequency divider 28 is here an oscillation signal, in particular a sinusoidal signal, which can be generated by a corresponding signal source, in particular by a quartz oscillator 23. In this case, the signal source can form part of the control and evaluation device 7 or even be separate therefrom. An output signal of the phase comparator 27 is supplied to a loop filter 29, the output signal of which in turn adjusts the controllable oscillator 25, in particular a capacitance of a capacitance diode.

The dividing factors of the frequency dividers 26, 28 can be adjusted by the control and evaluation device 7 in such a way that each (mobile) radio frequency can be generated in a channel spacing, wherein a spacing width may, for example, be 200 kHz, i.e., adjacent frequencies have a frequency spacing of 200 kHz from one another.

Frequencies of frequency bands FB1, FB2, FB3 or channels K1, . . . , K6 (see FIGS. 5 and 6) that can be used for signal transmission and which can also be referred to as valid bands or channels, or the frequencies assigned to these bands or channels, can be stored in the control and evaluation device 7. These frequencies can then be adjusted by adjusting the dividing factors.

These usable frequency bands FB1, FB2, FB3 or channels K1, . . . , K6 can be region-specific bands or channels. Different frequencies of usable frequency bands FB1, FB2, FB3 or channels K1, . . . , K6 can thus be stored for different regions or countries. Regions may, for example, be North America, China and South America, as well as Europe. The proposed device can thus be used in different regions, wherein for use in a specific region, the frequencies of the correspondingly region-specific frequency bands or channels used for signal transmission are stored in the control and evaluation device 7, in particular via a suitable interface, for example, a CAN bus interface. In principle, any desired combinations of frequencies can be stored in the control and evaluation device 7. The frequencies of the correspondingly region-specific frequency bands or channels used for signal transmission can thus be programmed in the control and evaluation device 7 via a CAN bus. If the region is exited, reprogramming can take place in a corresponding manner.

Figure 5:
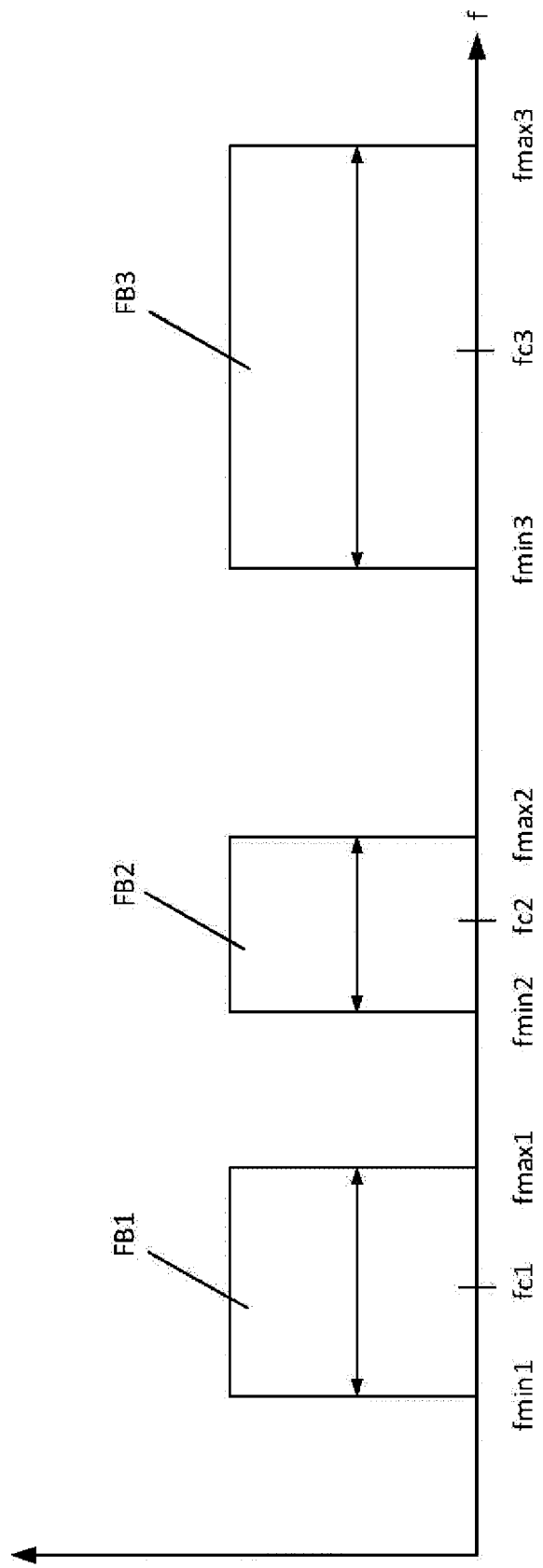

FIG. 5 shows a schematic overview of a plurality of frequency bands FB1, FB2, FB3 in which signals can be transmitted via the circuit arrangement 1. In each case, a lower cut-off frequency fmin1, fmin2, fmin3 and an upper cut-off frequency fmax1, fmax2, fmax3 of these frequency bands FB1, FB2, FB3 are shown. The bandwidth of the individual frequency bands FB1, FB2, FB3 is obtained as difference between the band-specific upper cut-off frequency fmax1, finax2, fmax3 and the band-specific lower cut-off frequency fmin1, fmin2, fmin3. Also shown are center frequencies fc1, fc2, fc3 of the individual frequency bands FB1, FB2, FB3. These center frequencies are obtained as the sum of the band-specific lower cut-off frequency fmin1, fmin2, fmin3 and half of the bandwidth mentioned.

In order to identify whether a signal is being transmitted in any one of these bands FB1, FB2, FB3, the frequency of the reference signal can be adjusted in a band identification step to the center frequency fc1 of the first frequency band FB1. A cut-off frequency of the filter device 16 can then be adjusted, for example, to half the value of the bandwidth of the first frequency band FB1. If it is then detected that the signal power of the signal provided by the device 17 (see, for example, FIG. 1) is greater than a prespecified threshold value or equal to the prespecified threshold value, it is identified that a signal is being transmitted in this first frequency band FB1.

Alternatively, however, it is also possible for the frequency of the reference signal to be adjusted in the band identification step to the minimum frequency, i.e., the band start frequency, of the first frequency band FB1. A cut-off frequency of the filter device 16 can then be adjusted, for example, to the value of the bandwidth of the first frequency band FB1. If it is then detected that the signal power of the signal provided by the device 17 is greater than a prespecified threshold value or equal to the prespecified threshold value, it is identified that a signal is being transmitted in this first frequency band FB1.

If it is detected that the signal power is less than the prespecified threshold value, no signal that is being transmitted in this first frequency band FB1 is identified. In this case, in a further band identification step, the frequency of the reference signal can be adjusted to the center frequency fc2 of the second frequency band FB2 and the cut-off frequency of the filter device 16 can be adjusted to half the bandwidth of the second frequency band FB2 or to the band start frequency of the second frequency band FB2 and the bandwidth of the second frequency band FB2. If it is then detected that the signal power of the signal provided by the device 17 (see, for example, FIG. 1) is greater than a prespecified threshold value or equal to the prespecified threshold value, it is identified that a signal is being transmitted in this second frequency band FB2.

If it is detected that the signal power is less than the prespecified threshold value, no signal that is being transmitted in this second frequency band FB2 is identified. In this case, in a further band identification step, the frequency of the reference signal can be adjusted to the center frequency fc3 of the third frequency band FB3 and the cut-off frequency of the filter device 16 can be adjusted to half the bandwidth of the third frequency band FB3 or to the band start frequency of the third frequency band FB3 and the bandwidth of the third frequency band FB3. If it is then detected that the signal power of the signal provided by the device 17 (see, for example, FIG. 1) is greater than a prespecified threshold value or equal to the prespecified threshold value, it is identified that a signal is being transmitted in this third frequency band FB3. If it is detected that the signal power is less than the prespecified threshold value, identification can then be continued accordingly.

Figure 6:
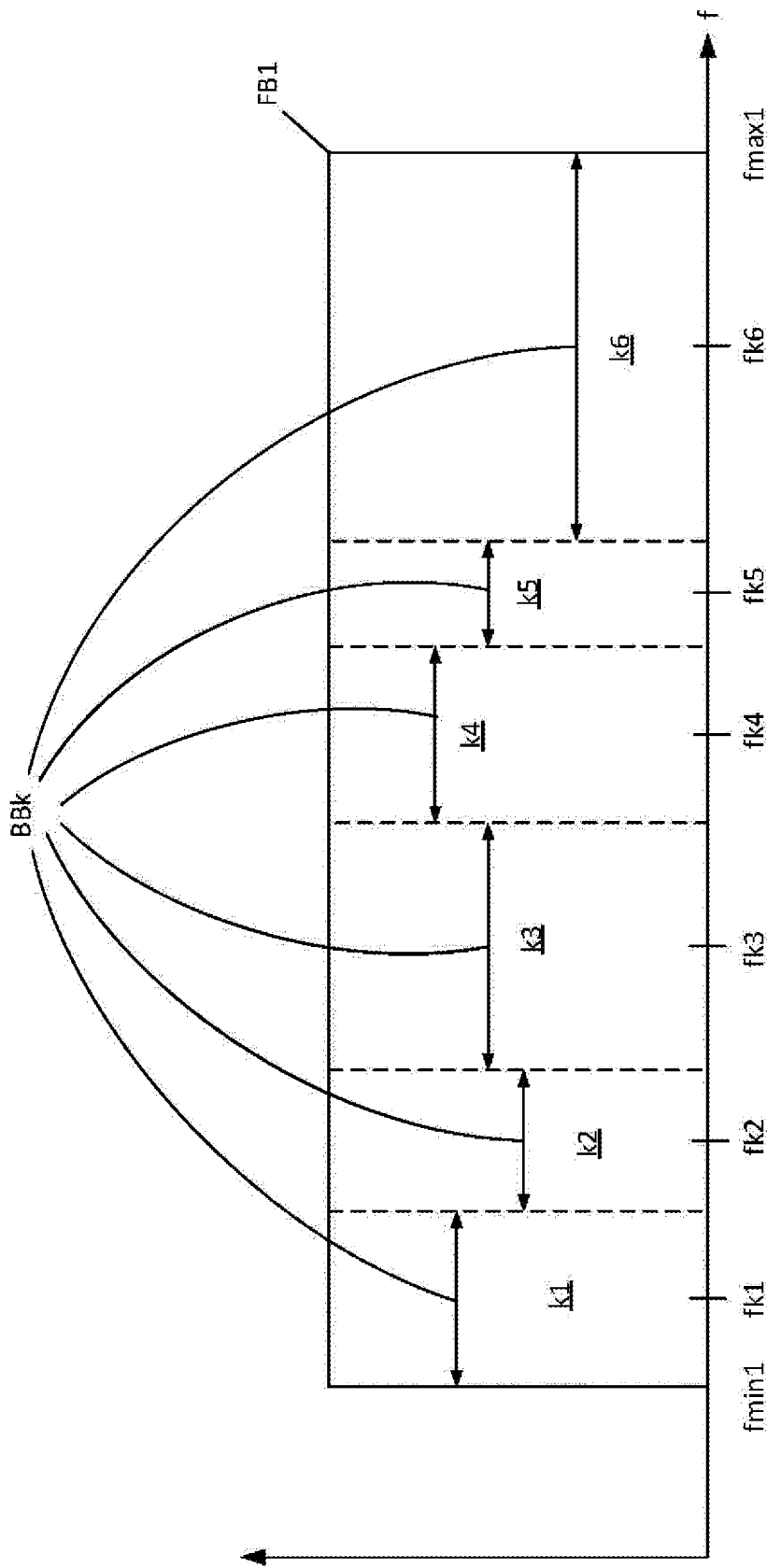

FIG. 6 shows a schematic view of the first frequency band FB1 with six channels K1, K2, K3, K4, K5, K6. Also shown are center frequencies fk1, fk2, fk3, fk4, fk5, fk6 of these channels K1, . . . , K6. A bandwidth BBK of the channels K1, . . . , K6 is also shown, wherein the channels K1, . . . , K6 in FIG. 6 have mutually different bandwidths BBK. Of course, it is conceivable for different channels K1, . . . , K6 to have the same bandwidths.

If it was detected, for example in a band identification step, that a signal is being transmitted in the first frequency band FB1, it is possible to check in a channel identification step, which is explained in more detail below with reference to FIG. 7, in which channel K1, . . . , K6 or in which channels K1, . . . , K6 of the first frequency band FB1 the signal or the signals are being transmitted. For this purpose, the previously mentioned grid check can be carried out.

If, for example, it has been identified that a signal is being transmitted in a frequency band FB1, FB2, FB3 or a channel K1, . . . , K6, it is possible for the correspondingly adjusted frequency of the reference signal as well as the cut-off frequency to be stored, for example by the control and evaluation device 7. Then, either identification can be terminated or a further band identification step or a further channel identification step can be carried out, for example in order to identify frequency bands FB1, FB2, FB3 or channels K1, . . . , K6 in which further signals are being transmitted, in particular simultaneously, via the circuit arrangement 1. At a later point in time, the stored frequencies can be retrieved and thus a level of the signal that is being transmitted in the corresponding frequency band FB1, FB2, FB3 or in the corresponding channel K1, . . . , K6 can be quickly determined again. This can be carried out, for example, for monitoring the corresponding frequency band FB1, FB2, FB3 or channel K1, . . . , K6. The stored frequencies can also be used to monitor the corresponding frequency band FB1, FB2, FB3 or the corresponding channel K1, . . . , K6 with the monitoring section shown in FIG. 3.

Figure 7:
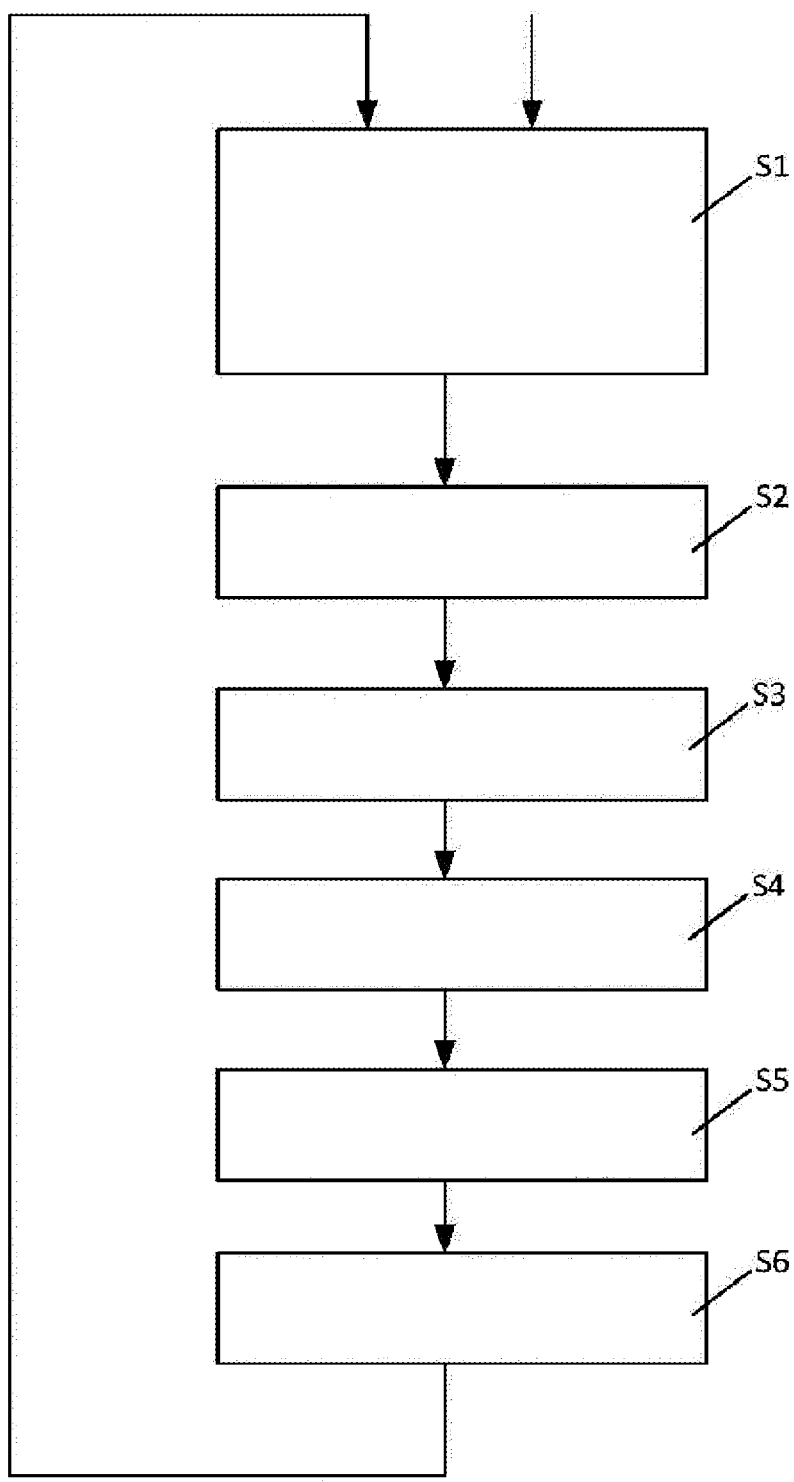

FIG. 7 shows a schematic flow chart of a method according to the invention for identifying a frequency band FB1, FB2, FB3 or channel K1, . . . , K6 in which a signal is being transmitted. In a first step S1, a decoupled signal is provided, for example by the signal coupler 9 shown in FIG. 1. In a second step S2, a reference signal of a prespecified frequency is provided, in particular by the device 15 for generating a reference signal.

For example, it can be checked whether a signal is being transmitted in a first frequency band FB1. For this purpose, the frequency of the reference signal can be adjusted to a band start frequency, for example, 1920 MHz, or a band end frequency, for example, 1980 MHz, and the cut-off frequency of the filter device 16 designed as a low-pass filter device can be adjusted to 60 MHz.

The reference signal and the decoupled signal are mixed in a third step S3 and filtered in a fourth step S4, in particular by means of the filter device 16. In a fifth step S5, a signal power of the filtered signal is determined. In a sixth step S6, the signal power is compared with a prespecified threshold value (identification threshold value), wherein as a function of the frequency of the reference signal, a frequency band FB1, FB2, FB3 (see FIG. 5) assigned to this frequency or a channel K1, . . . , K6 assigned to this frequency is identified as the frequency band/channel in which a signal is being transmitted, in this case the first frequency band, if the signal power is greater than the prespecified threshold value or equal to the prespecified threshold value.

No frequency band/channel or no signal transmission in the checked band or channel is identified if the signal power is less than the prespecified threshold value. The sequence from the first to the sixth step S1, . . . , S6 can also be referred to as a band or channel identification step. As explained above, not only in the case of an identification but also in the case of non-identification, a further band or channel indication step may be carried out, for example in order to identify a frequency band/channel in which a further signal is being transmitted or to identify a channel in which a signal of an identified frequency band FB1, FB2, FB3 is being transmitted. When a further band or channel identification step is carried out, the frequency of the reference signal and the cut-off frequency of the filter device 16 can be changed. If, for example, it is to be checked whether a signal is being transmitted in a third frequency band FB3, the frequency of the reference signal can be adjusted to the corresponding band start frequency, for example, 1710 MHz, or to the corresponding band end frequency, for example, 1785 MHz, and the cut-off frequency of the filter device 16 can be adjusted to the corresponding bandwidth, for example, 75 MHz.

As an alternative to comparing the signal power with a prespecified threshold value in order to identify a signal transmission in a frequency band/channel, the corresponding frequency of the reference signal and the corresponding cut-off frequency of the filter device 16 can in each case also be adjusted for a plurality of bands/channels, as explained, and the band-specific signal power of the filtered signal can be determined and stored. The frequency band/channel to which the maximum band-specific signal power is assigned and/or to which a band-specific signal power is assigned and which is more than a prespecified amount greater than the band-specific signal powers assigned to the further frequency bands/channels can then be identified as the frequency band/channel in which a signal transmission is taking place.

The explained identification of a frequency band/channel or a plurality of frequency bands/channels in which a signal transmission is taking place preferably takes place in less than a prespecified time period, which may be 10 ms, for example.

If, as explained above, a frequency band is identified in which a signal transmission is taking place, a frequency-band-specific channel or a plurality of frequency-band-specific channels of the identified frequency band and their respective channel bandwidths, in which the signal transmission is taking place, can also be identified. This can take place in a so-called channel identification step.

For this purpose, the cut-off frequency of the filter device 16 can be adjusted to a prespecified spacing width, for example, to 200 KHz. Then, starting at the band start frequency of the identified frequency band, the frequency of the reference signal can be incremented in increments by the prespecified spacing width up to the band end frequency, wherein for each of these reference signals adjusted in this way, the signal power of the filtered signal is determined and stored as segment power, wherein the signal power is also determined for the band start frequency. During this incrementation, the reference signal can be generated for each of the adjusted frequencies for a prespecified time period, which can be dependent on the settling time of the device for generating the reference signal, the measurement time of the device for the determination and the evaluation time which the control and evaluation device needs. After this time period has elapsed, the corresponding incrementation can take place.

In other words, the frequency band is stepped through continuously, wherein the filtered signal power is in each case determined for 200 KHz-wide segments of the frequency band.

Then, as explained above, the channel or channels and the corresponding bandwidths in which a signal transmission takes place can be identified as a function of the stored segment power.

Figure 8:
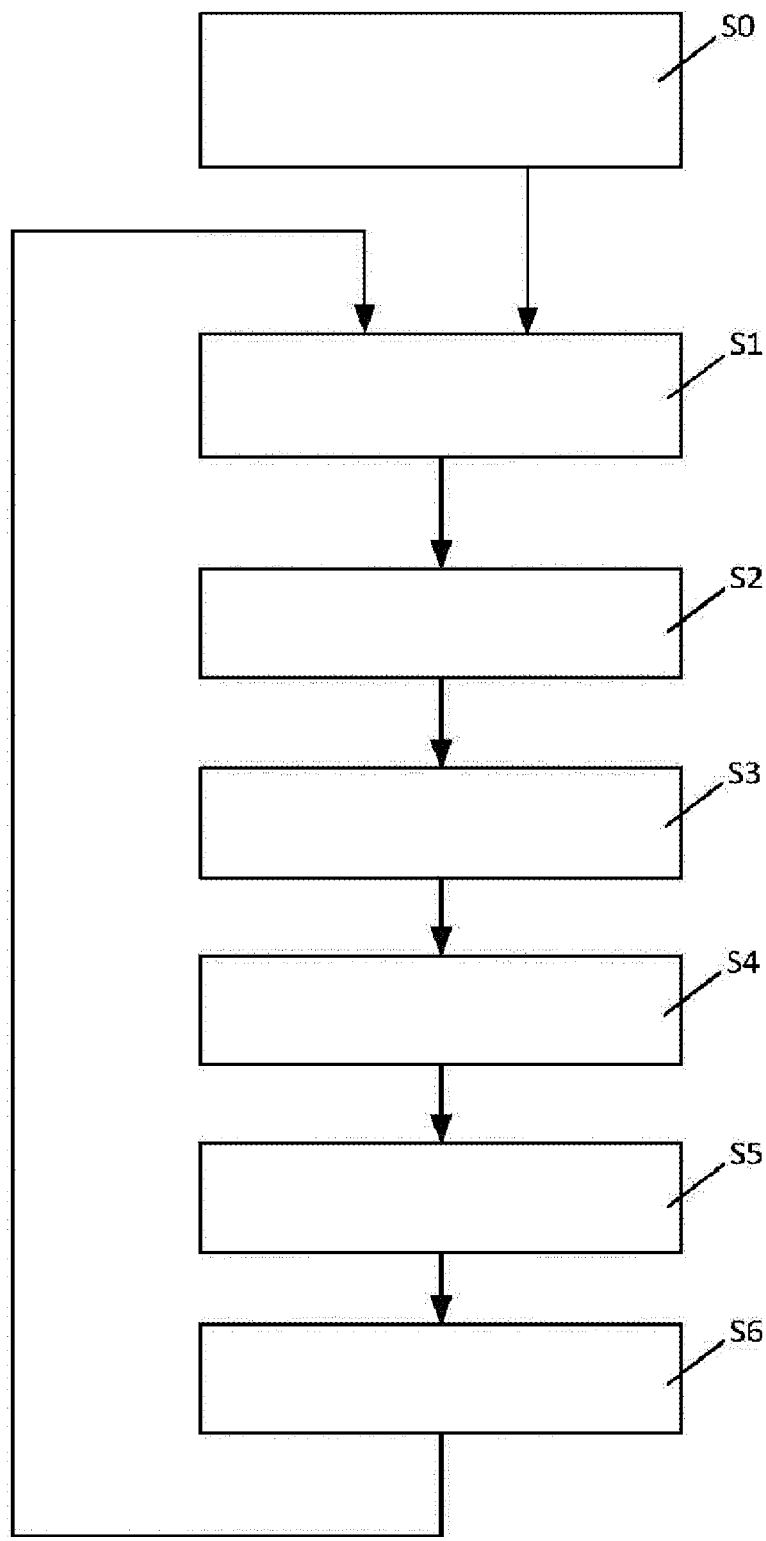

FIG. 8 shows a schematic flow chart of a method according to the invention in a further embodiment. It is shown here that a step S0 for detecting a signal transmission takes place before an identification step is carried out, wherein this step S0 is carried out in particular with the device for signal transmission detection shown in FIG. 2. If it is detected that a signal is being transmitted via the circuit arrangement 1, an identification step is started.

The invention claimed is:

1. A circuit arrangement for transmitting a signal, wherein the circuit arrangement comprises:
a signal coupler configured to provide a decoupled uplink or downlink signal;
a reference-signal device configured to provide a reference signal of adjustable frequency;
a mixer configured to mix the decoupled uplink or downlink signal and the reference signal to generate a mixed signal; and
at least one filter device configured to low-pass or band-pass filter the mixed signal so as to generate a filtered signal;
an evaluation device configured to evaluate the filtered signal to identify a frequency band or a channel for transmitting the signal based on the reference signal and at least one signal property of the filtered signal; and
a terminal-device-side interface to transmit the signal based on the identified frequency band or channel for transmission.

2. The circuit arrangement of claim 1, wherein the circuit arrangement further comprises a signal-power device configured to determine a signal power of the filtered signal.

3. The circuit arrangement of claim 1, wherein a cut-off frequency of the filter device can be adjusted.

4. The circuit arrangement of claim 2, wherein the reference-signal device is designed as a phase-locked loop or comprises the phase-locked loop.

5. The circuit arrangement of claim 3, wherein the circuit arrangement further comprises a control device configured to adjust the frequency of the reference signal and a cut-off frequency of the filter device.

6. The circuit arrangement of claim 2, wherein the circuit arrangement further comprises a signal-detection device configured to detect signal transmission.

7. The circuit arrangement of claim 2, wherein the circuit arrangement further comprises a switching element, wherein a first port of the signal coupler is connected to the mixer in a first switching state of the switching element, and a second port of the signal coupler is connected to the mixer in a second switching state of the switching.

8. The circuit arrangement of claim 2, wherein the circuit arrangement further comprises a bypass device configured to transmit the decoupled uplink or downlink signal between the signal coupler and the mixer.

9. The circuit arrangement of claim 1, wherein the evaluation device is further configured to determine a channel bandwidth of the identified frequency band or channel.

10. A method for transmitting a signal, comprising:
providing a decoupled uplink or downlink signal;
providing at least one reference signal of at least one prespecified frequency;
mixing the decoupled uplink or downlink signal and the at least one reference signal to generate at least one mixed signal;
filtering the at least one mixed signal to generate at least one filtered signal;
determining at least one signal property of the at least one filtered signal; and
identifying a frequency band or a channel for transmitting the signal based on the at least one reference signal and on the at least one signal property of the at least one filtered signal; and
transmitting the signal based on the identified frequency band or channel for transmission.

11. The method of claim 10, wherein the at least one reference signal comprises a plurality of reference signals of different frequencies, wherein each of the plurality of reference signals is mixed with the decoupled uplink or downlink signal to generate a plurality of mixed signals that are filtered to generate a plurality of filtered signals.

12. The method of claim 10, further comprising:
determining a cut off frequency of a filter that generates the at least one filtered signal.

13. The method of claim 10, wherein identifying the frequency band or the channel comprises identifying the frequency band, the method further comprising:
identifying a channel of the frequency band.

14. The method of claim 13, further comprising:
identifying a channel bandwidth of the channel.

15. The method of claim 10, further comprising:
after identifying the frequency band or the channel, starting monitoring the at least one signal property; and
identifying an additional frequency band or an additional channel for transmitting.

16. The method of claim 15, wherein monitoring the at least one signal property and identifying the additional frequency band or the additional channel are carried out simultaneously.

* * * * *